Oct. 27, 1931.    H. RÖHL    1,829,370
REFRIGERATING APPARATUS
Filed June 16, 1928
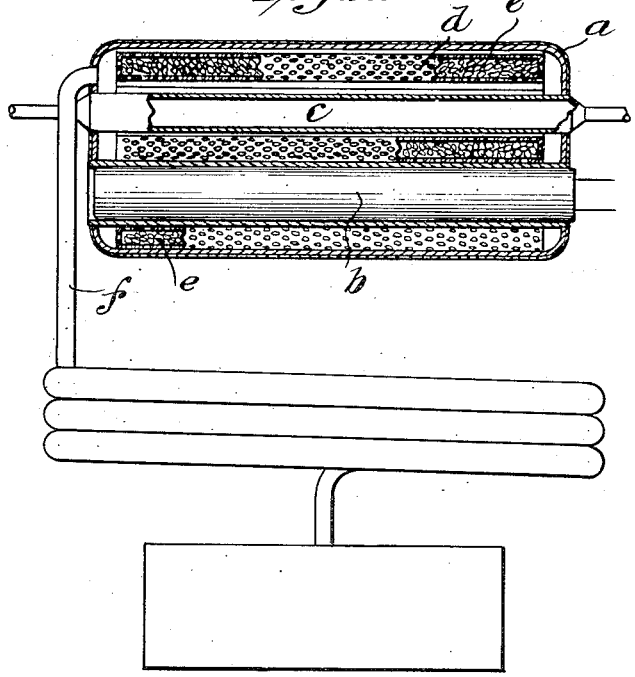
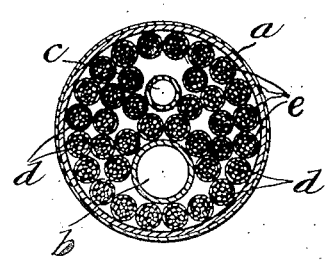
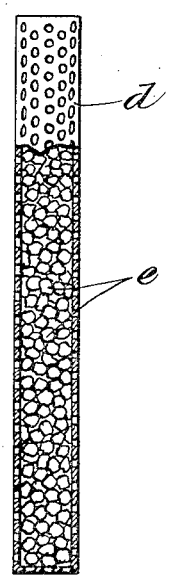
Hans Röhl
INVENTOR
BY W. B. Whitney
ATTORNEY Patented Oct. 27, 1931

1,829,370

UNITED STATES PATENT OFFICE

HANS RÖHL, OF MANNHEIM, GERMANY, ASSIGNOR TO SCHWARZWALDWERKE LANZ, G. M. B. H., OF MANNHEIM, GERMANY

REFRIGERATING APPARATUS

Application filed June 16, 1928, Serial No. 285,830, and in Germany December 24, 1927.

This invention relates to refrigerating apparatus of the absorption type, wherein a dry absorption material such, for example, as chloride of calcium is alternately cooled and heated to cause it first to absorb and then to liberate a refrigerating gas or other medium.

In order to obtain for the absorption material a large exposed surface it has heretofore been spread in thin layers upon a series of circular plates mounted one above the other within an upright cylindrical casing or container about a central vertical pipe to which the plates are bonded metallically and from which the absorption material is alternately cooled and heated.

The absorption-expulsion vessel as thus constructed, being necessarily of small diameter and hence of considerable height, has the defect that any vibration thereof, due for example to passing wagons or the like, disturbs the even distribution of the absorption material on or may even shake some of it off the plates. Furthermore, the construction does not provide an economical utilization of the space required, there is difficulty in the assembling of the parts, and the heat radiated therefrom in the vicinity of the condenser is a source of trouble.

The present invention, by which I have obviated the above-enumerated defects, consists of an absorption-expulsion vessel, of new and improved construction, in which a drum or casing, provided with the usual, or any suitable, cooling and heating pipe or pipes and preferably horizontally disposed, is subdivided interiorly by perforated tubes, sheet metal partitions, or the like, into a series of parallel longitudinal chambers which are alternately filled with the absorption material and left open for the passage of the refrigerating medium to and from the absorption material through the openings in the partition walls.

One practical embodiment of the invention is shown, by way of illustration and not of limitation, in the accompanying drawings, in which—

Figure 1 is a view showing the absorption-expulsion vessel in vertical longitudinal section and other parts of the apparatus, diagrammatically, in elevation; Fig. 2 is a view of the vessel in transverse section; and Fig. 3 is an enlarged view, partly in plan and partly in section, of one of the perforated tubes charged with absorption material.

Referring to the drawings, $a$ is the drum or casing of the absorption-expulsion vessel, which as shown is seated horizontally but obviously may be placed in a different position if desired and is, or may be, enclosed in a heat-insulating covering; $b$ is the heating device, a metallic cylinder in which is fitted an electrical heating element as indicated; $c$ is the cooling pipe which passes through the drum and through which water or other cooling medium is intermittently caused to flow; and $d\ d$ are the perforated tubes by which the interior of the drum is subdivided and in which, as shown, the absorption material $e$ is packed, which tubes are heat-conductively connected to each other and to the heating and cooling pipes by their contacting metallic walls. The absorption charges within the tubes are thus enabled to act upon the refrigerating medium, which is admitted to and expelled from the drum through the pipe $f$, not only at both ends but, through the openings in their walls, throughout the length of the tubes.

It is seen that in the construction described, a very great permeability is given to the absorption charges, and that large surfaces thereof are provided for taking up heat and for expansion. The apparatus is not only exceedingly efficient, but its efficiency is not affected either by a change in the position or by the jarring of the drum, since the equilibrium of the charges is not disturbed thereby and there can be no loss of effective absorption material.

The absorption material may, as above intimated, be packed into the spaces formed between the perforated tubes, leaving the tubes themselves open to serve as chambers and inlet-outlet channels for the refrigerating medium; and the invention can be further modified in its several details, within the scope of the appended claims, without departing from the spirit or sacrificing the substantial advantages thereof.

What I claim as new, and desire to secure by Letters Patent, is—

1. In refrigerating apparatus of the type described, an absorption-expulsion vessel comprising a casing interiorly sub-divided by perforated metallic partitions into a plurality of longitudinal chambers, each of relatively small sectional area, which are separated from each other only by the partitions and are alternately charged with absorption material and left open for the passage of the refrigerating medium.

2. In refrigerating apparatus of the type described, an absorption-expulsion device comprising as elements thereof a series of narrow longitudinal chambers extending side by side and separated one from another by perforated metallic walls, said chambers being alternately charged with an absorption material and left open for the passage of the refrigerating medium, and means for alternately heating and cooling the absorption material by conduction from one chamber to another through said metallic walls.

3. In refrigerating apparatus of the type described, an absorption-expulsion vessel comprising a drum, a plurality of perforated metallic tubes filled with absorption material packed longitudinally side by side in contact one with another, within and substantially filling the interior of the drum, an inlet-outlet opening through which to conduct the refrigerating medium to and from the interior of the drum and the longitudinal passages formed between the tubes, and means for alternately heating and cooling the walls of the tubes.

4. In refrigerating apparatus of the type described, an absorption-expulsion device comprising a casing packed interiorly with a metallic heating chamber, a metallic cooling chamber, and a plurality of perforated metallic tubes charged with absorption material, all extending longitudinally side by side with their metallic walls in conductive contact one with another, means for conducting a refrigerating medium to and from the casing and the passages formed between the tubes, means for heating the walls of the heating chamber, and means for cooling the walls of the cooling chamber.

5. In refrigerating apparatus of the type described, an absorption-expulsion element comprising a rigid cylindrical metallic tube having perforations in its sides and filled with absorption material.

6. In refrigerating apparatus of the type described, an absorption-expulsion element comprising a metallic tube with open ends and perforated walls filled with absorption material.

HANS RÖHL.